Oct. 27, 1964  J. E. ADAMS  3,153,810
APPARATUS FOR MOLDING FOOD PRODUCTS
Filed Oct. 29, 1962
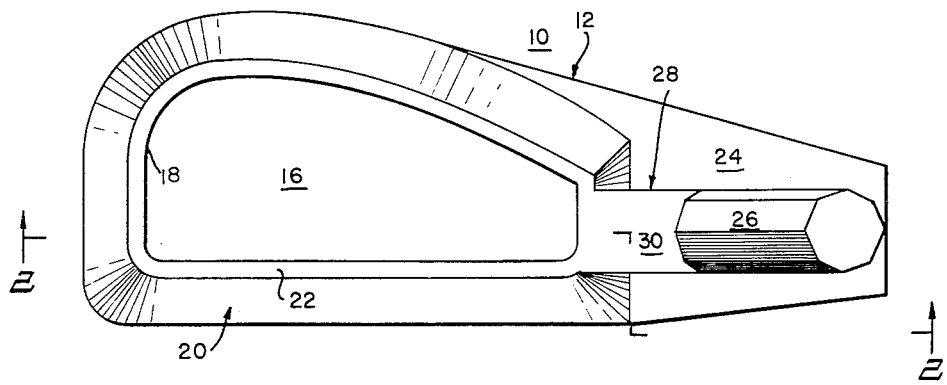
Fig. 1
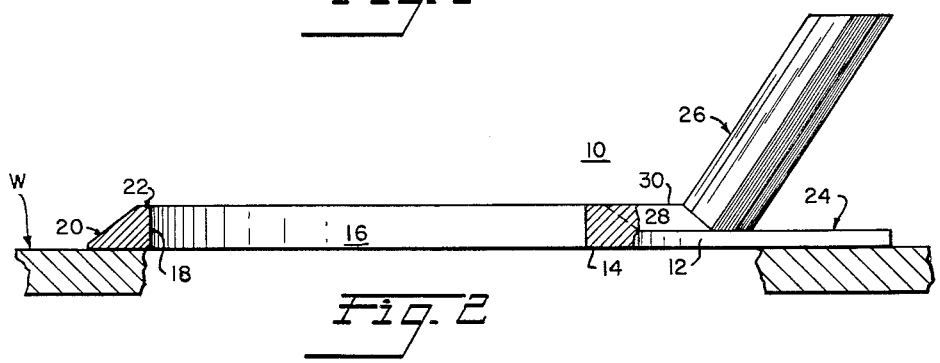
Fig. 2
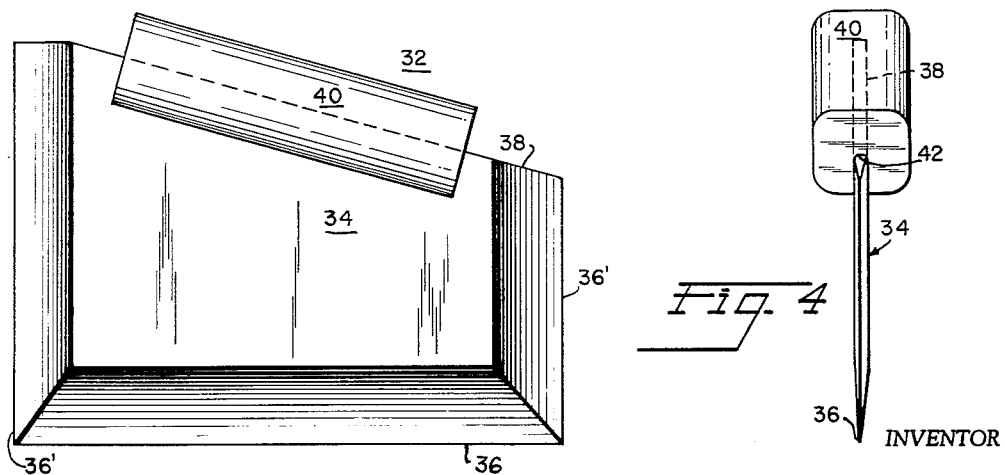
Fig. 3
Fig. 4
INVENTOR
JETT E. ADAMS
BY Herbert M. Birch
ATTORNEY 3,153,810
APPARATUS FOR MOLDING FOOD PRODUCTS
Jett E. Adams, 6014 Narhill St., Houston 9, Tex.
Filed Oct. 29, 1962, Ser. No. 233,547
1 Claim. (Cl. 17—32)

This invention relates to food molds and more particularly, to food molds for ground and chopped meat products and the like.

It is an object of this invention to provide novel food molds which permits the user to readily achieve optimum uniformity as to thickness, shape, weight and quality of molded food products, whereby rigid cost control in food handling establishments is readily maintainable.

It is another object of this invention to provide a novel food molding apparatus which materially reduces labor time.

Another object of this invention is to provide a novel food mold having no moving parts.

Still another object of this invention is to provide food molds having a novel structure facilitating the manual handling of the said molds with respect to a flat working surface.

Yet another object of this invention is to provide food molds having a novel structure adapted to coact with scraper means, whereby expeditious molding of food products may be accomplished.

These and other objects of this invention will become more apparent with reference to the following specification and drawings which relate to a preferred embodiment of the invention.

In the drawings:

FIGURE 1 is a top plan view of a food mold of the present invention;

FIGURE 2 is a cross-section taken along line 2—2 of FIGURE 1, with the food mold further shown as sitting on a flat working surface;

FIGURE 3 is a side elevation of a scraper adapted to be used in conjunction with the mold of FIGURES 1 and 2; and FIGURE 4 is an end view of the scraper of FIGURE 3.

Referring in detail to the drawings and more particularly, to FIGURES 1 and 2, the mold 10 is shown as comprising a plate 12 having a flat bottom 14 adapted to sit flush with any suitable flat working surface W.

A mold cavity 16 having vertical internal boundaries 18 extends through the plate 12, which for aesthetic appeal, may be conformally shaped with respect to the mold cavity 16 as shown in FIGURE 1. Innumerable shapes may be selected for the mold cavity 16 as can be readily appreciated.

Surrounding the mold cavity, the plate 12 is shaped to comprise a raised externally bevelled shoulder portion 20 for the mold cavity 16. The shoulder 20 terminates, adjacent the said mold cavity, in a horizontally disposed peripherally conformed ledge or guide surface 22, surrounding the mold cavity 16, which will be hereinafter more fully described as to its particular function.

The mold cavity 16 and the beveled portion 20 extend from a position immediately adjacent one end of the plate 12, to an intermediate point thereon whereby the remainder of the plate 12 comprises an extended foot portion 24. A handle or grip 26, shown in the form of an octagonal rod, extends upwardly and longitudinally from the foot portion 24, with which it is integrally attached, from a position on said foot portion spaced from the beveled shoulder 20, to a position above the surface of the said foot portion, wherein the outermost extremity of the handle 26 is either vertically above the outer end of the said foot portion or some point on the surface of the said foot portion.

Extending longitudinally of the plate 12 from the root end of the handle 26 to the frame portion 20 is a raised longitudinal rib 28 having a flat upper guide surface 30 which is an integral extension of the conformal peripheral guide surface 22 adjacent the mold cavity 16. The guide surface 30 may be horizontal as shown or may slope from the peripheral guide surface 22 to the handle 26 as desired.

Referring now to FIGURES 3 and 4, the scraper 32 is shown as comprising a flat blade portion 34 having a lower scraping and cutting edge 36, adapted to be horizontally disposed in normal use, and sharpened end scraping and cutting edges 36' and adapted for cutting scraping and sizing of serving portions, when used in conjunction with certain mold designs, and an upper edge 38 angularly disposed with respect to the lower scraping edge 36; and an elongated grip portion 40 having a central slot 42 therein which fits over the edge 38 of the blade 34 to thereby form an integral grip structure with the said blade 34.

In operation, first referring to FIGURES 1 and 2, the mold 10 is grasped by the handle 26 and placed upon any suitable flat working surface W, where it is readily held by virtue of the relative positioning of the foot 24 and the handle 26 which, together, act to produce a moment of force directed downward through the root of the handle 26. Thus, normal hand pressure acting on the handle 26 causes the flat undersurface 14 of the plate 12 to positively bear against any suitable flat working surface W. In a preferred embodiment, it has been determined that an acute angle of fifty-five degrees (55°) subtended by the handle 26 and the foot 24 of the mold 10 provides optimum comfort for the user of the mold.

While the mold 10 is held against the above-defined working surface W, chopped meat or the like is manually pressed into the mold cavity 16 from the top thereof until the cavity 16 is filled.

The scraper 32 is then grasped, by the handle 40, with the other hand of the user of the mold 10 and the scraping edge 36 of the blade 34 is placed on the flat guide surface 30 of the raised longitudinal rib 28 adjacent the root of the mold handle 26. The offset of the scraper handle 40 with respect to horizontal as effected by its position on the upper edge 38 of the blade 34, permits a comfortable and secure hold to be obtained on the scraper 32 while maintaining the scraping edge 36 thereof in a substantially horizontal position.

The scraper 32 is now moved from the root of the mold handle 26 toward the opposite end of the mold cavity 16, whereby the scraping edge 36 thereof is caused to traverse the mold cavity 16 while bearing first on the flat guide surface 30 of the raised rib 28 and then on the peripherally conformal guide surface 22 around the said mold cavity. Thus, any excess meat in the mold cavity 16 is trimmed off by the scraper 32 and the resulting pressed food cutlet is completed.

The mold 10 may now be tipped with respect to the working surface W against which it has been applied, and the pressed cutlet contained therein will clear the mold cavity 16, remaining on the flat working surface W without being assisted due to the natural adhesion of the food cutlet with the flat surface W.

By the use of the novel mold 10 and novel cooperating scraper 32 as provided by this invention, optimum uniformity as to size, shape, weight and quality of a plurality of molded food products produced thereby may be maintained.

It is to be understood that the embodiments of the invention shown and described herein are for the purpose of example only and are not intended to limit the scope of the appended claim.

What is claimed is:

A food mold comprising a plate having a flat lower surface, said plate defining an open mold cavity and a foot portion at one end of said mold cavity, a raised longitudinal rib attached to the same end of the mold cavity overlying said foot portion, a handle attached to the outer end of said longitudinal rib and extending upwardly at an acute angle over said foot portion, the top of said longitudinal rib and said mold cavity being on the same plane and both being unobstructed.

References Cited in the file of this patent

UNITED STATES PATENTS

| | | |
|---|---|---|
| 2,013,879 | Dillenback | Sept. 10, 1935 |
| 2,081,080 | Baker | May 18, 1937 |
| 2,484,460 | Pedro | Oct. 11, 1949 |